(12) United States Patent
Olivier

(10) Patent No.: US 9,261,617 B2
(45) Date of Patent: Feb. 16, 2016

(54) ROPE-TENSION SYSTEM FOR A MARINE SEISMIC CABLE

(71) Applicant: ION Geophysical Corporation, Houston, TX (US)

(72) Inventor: Andre' W. Olivier, River Ridge, LA (US)

(73) Assignee: ION Geophysical Corporation, Houston, TX (US)

( * ) Notice: Subject to any disclaimer, the term of this patent is extended or adjusted under 35 U.S.C. 154(b) by 453 days.

(21) Appl. No.: 13/707,847

(22) Filed: Dec. 7, 2012

(65) Prior Publication Data

US 2013/0148473 A1    Jun. 13, 2013

Related U.S. Application Data

(60) Provisional application No. 61/568,495, filed on Dec. 8, 2011.

(51) Int. Cl.
*G01V 1/38*     (2006.01)
*G01V 1/20*     (2006.01)

(52) U.S. Cl.
CPC    *G01V 1/38* (2013.01); *G01V 1/202* (2013.01); *G01V 2001/204* (2013.01)

(58) Field of Classification Search
CPC ........... G01V 1/201; G01V 1/38; G01V 1/16; G01V 1/20
USPC ....................................................... 367/177
See application file for complete search history.

(56) References Cited

U.S. PATENT DOCUMENTS

| | | | |
|---|---|---|---|
| 3,326,356 A | | 6/1967 | Maczuzak |
| 3,930,254 A | * | 12/1975 | Pavey, Jr. ...................... 367/172 |
| 5,259,597 A | * | 11/1993 | Fredheim ........................ 267/69 |
| 5,943,293 A | | 8/1999 | Luscombe et al. |
| 6,775,203 B2 | * | 8/2004 | Fagerås et al. .................. 367/16 |
| 7,684,283 B2 | | 3/2010 | Berland |
| 2009/0107720 A1 | | 4/2009 | Berland |
| 2011/0005801 A1 | | 1/2011 | Olivier et al. |

FOREIGN PATENT DOCUMENTS

| | | |
|---|---|---|
| EP | 0508587 A2 | 10/1992 |
| EP | 1385022 A1 | 1/2004 |

OTHER PUBLICATIONS

Are Matthiesen, "OBC gives a smarter and gentler handling of cables," originally published in International Hydrographic & Seismic Search, Feb. 2008.

* cited by examiner

*Primary Examiner* — Luke Ratcliffe
(74) *Attorney, Agent, or Firm* — James T. Cronvich

(57) ABSTRACT

A rope-tension system for a marine seismic cable comprising a series of sensor nodes connected between flexible cable sections connected to other sensor nodes and flexible sections by armored cable segments. The flexible sections, which are housed in flexible protective covers, have a pair of ropes as stress members. The two ropes are pivotably pinned at both ends to termination units at the opposite ends of the flexible sections. The two ropes extend through a ring positioned between the two termination units. The pivots at the rope ends form linkages with the ropes that allow the ropes to adjust their positions as the flexible section engages a curved surface during retrieval. The ring presents bearing surfaces with a large radius of curvature to the ropes to avoid sharp bending loads.

26 Claims, 2 Drawing Sheets

ROPE-TENSION SYSTEM FOR A MARINE SEISMIC CABLE

BACKGROUND

The invention relates generally to offshore seismic prospecting and more particularly to marine seismic cables having multiple sensors, such as hydrophones, geophones, and accelerometers, disposed along the lengths of the cables.

Marine seismic cables instrumented with hydrophones and other sensors are used in prospecting for oil and gas trapped under the sea floor. Ocean Bottom Cables (OBCs) are seismic cables that are laid on the sea floor by a deployment vessel. Hydrophones and other sensors in the OBCs are used to detect reflections of periodically emitted seismic waves off geologic structures under the sea floor. The reflected seismic waves detected by hydrophones and particle motion sensors in the OBCs are used to produce a map of the subsea formations. After deployment, OBCs have to be retrieved by the vessel and stored.

In retrieving the seismic cables, cable-handling systems pull the cable aboard the survey vessel. During this retrieval process, the cable is subjected to severe tension that creates high bending loads in rigid cable sections, such as at sensor housings, as they pass over curved surfaces of the cable-handling equipment. The high bending loads can damage the rigid sections or shorten the useful life of the cable.

Some seismic cables use hydrophones to detect variations in acoustic pressure and motion sensors, such as geophones and accelerometers, to detect particle motion caused by reflected seismic waves. The motion sensors are particularly sensitive to vibrations in the cable that can be transmitted along its stress members, which, in OBCs, are often metal cables. High-modulus fiber ropes are sometimes used as stress members to provide better acoustic isolation than conventional wire ropes.

SUMMARY

One version of a seismic-cable flexible section embodying features of the invention comprises first and second termination units and two or more ropes, each pivotally attached at one end to the first termination unit and at the other end to the second termination unit. A ring surrounds a portion of the ropes between the first and second termination units.

Another version of a flexible section embodying features of the invention comprises first and second sets of eyelets pivotally attached to first and second termination units. Each of a plurality of ropes extends from the first termination unit to the second termination unit. Each end of the ropes has a loop that is received on a bearing surface of a respective one of the pivotable eyelets.

Yet another version of a flexible cable section embodying features of the invention comprises a plurality of ropes whose ends are attached at spaced apart locations on first and second termination units. A ring disposed between the first and second termination units has a bore that opens onto first and second ends of the ring. The ropes extend side by side through the bore. The bore has a first maximum opening dimension at the first end of the ring that is less than the distance spacing the ends of the ropes attached to the first termination unit and a second maximum opening dimension at the second end of the ring that is less than the distance spacing the ends of the ropes attached to the second termination unit.

BRIEF DESCRIPTION OF THE DRAWINGS

These features and versions of the invention are described in more detail in the following description, appended claims, and accompanying drawings, in which:

DETAILED DESCRIPTION

Figure 1:
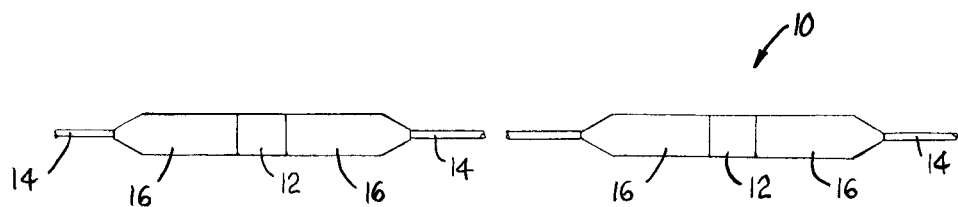
FIG. 1 is a side view of a portion of an instrumented marine seismic cable embodying features of the invention.

A representative portion of an instrumented underwater seismic cable embodying features of the invention is shown in FIG. 1. The seismic cable 10 in this example is an OBC that is deployed from a survey vessel, laid on the sea floor to perform a survey, and reeled back onto the vessel for redeployment elsewhere. The OBC comprises a series of sensor nodes 12 connected to an armored cable 14 by a flexible section 16 protected by an outer flexible cover (18, FIG. 2B) that may also provide isolation from acoustic vibrations in the OBC. The sensor nodes 12 include an outer housing encasing one or more sensors, such as acoustic-pressure and particle-motion sensors. Power for the sensors and communications between the sensors and the survey vessel are routed through conductors in the core of the armored cable 14. The repeating sequence of armored cable segment, flexible section, sensor node, flexible section, armored cable segment continues along the length of the seismic cable.

Figure 2A:
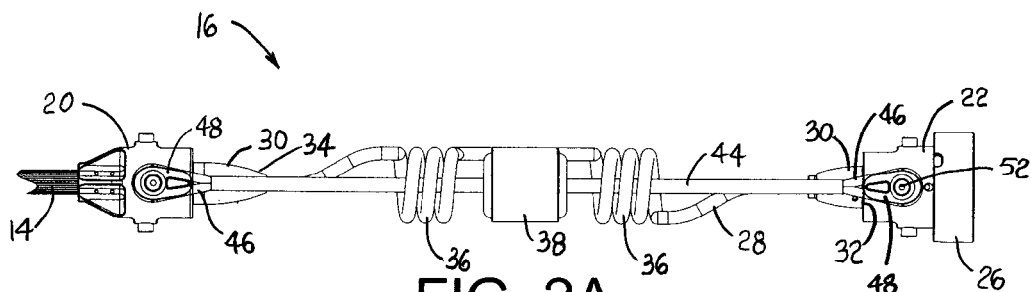
FIGS. 2A and 2B are side views of a flexible section in a seismic cable as in FIG. 1 shown in two orthogonal views.
Figure 2B:
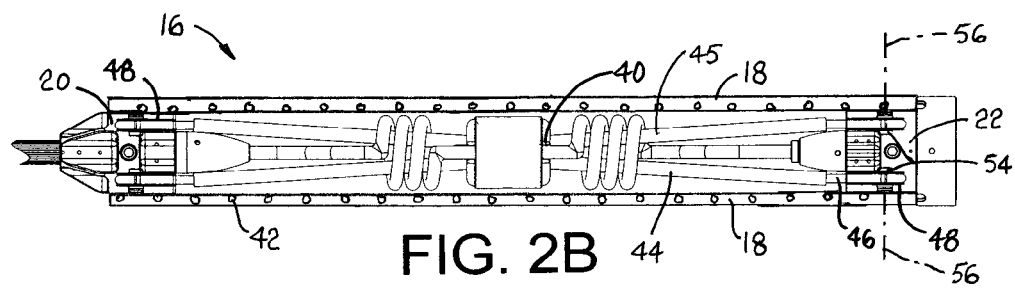

The flexible section 16 is shown in more detail in FIGS. 2A and 2B from two orthogonal perspectives. The flexible section 16 includes two termination units: a termination cone 20 at one end of the flexible section and a cable end connector 22 at the opposite end. The armored cable 14 is mechanically terminated to the termination cone 20. A coupling ring 26 connects the cable end connector 22 to the sensor node 12. An electrical conductor bundle 28, consisting of a bundle of wires, extends along the length of the flexible section 16. The conductor bundle 28 passes through termination nuts 30 at each end. Each nut has a base 32 and a nosecone-shaped face 34. The bases of the nuts are fastened to the termination units 20, 22, and the nosecone-shaped faces extend in length outward from the termination units toward each other. Service loops 36 in the conductor bundle relieve tension that could occur as the flexible section bends. A spacer ring 38 positioned intermediately between the two termination units 20, 22 has an outer slot 40 that accommodates the conductor bundle 28. The flexible section 16 is encased in the flexible protective cover 18, or jacket, which is made of a heavy-duty, thick rubber or elastomeric material and may also include a heavy-gauge coil spring 42 extending along its length. The flexible jacket and optional coil spring facilitate bending of the flexible section around the nonlinear surfaces of cable-handling equipment and may also help isolate the sensors in the sensor node from acoustic vibrations in the armored cable.

Figure 3:
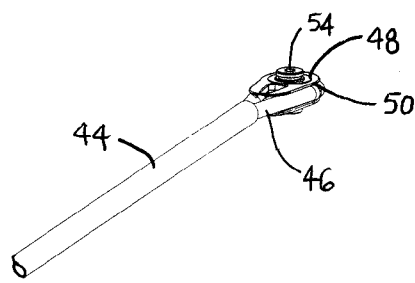
FIG. 3 is an isometric view of the end of a rope looped around a pivotable eyelet in a termination unit in the flexible section of FIGS. 2A and 2B.
Figure 4:
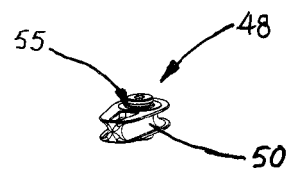
FIG. 4 is an isometric view of the eyelet of FIG. 3.

Two ropes 44, 45 extend through the flexible section 16. The ropes act as stress members that carry the tension in the seismic cable 14. For applications requiring vibration or other acoustic isolation, the stress members are preferably high-modulus fiber ropes for strength, light weight, and flexibility with minimal stretch. They are, for example, made of synthetic materials, such as Kevlar®, Vectran®, and Dyneema®. The synthetic ropes are easy to handle and provide good acoustic isolation when slack. But in applications where vibration isolation is not so important, wire ropes, which have different stiffness properties from the synthetic ropes, may be used. As also shown in FIG. 3, each rope has a loop 46 at each end. In this example, each end of the rope forms a closed loop. The loop 46 is looped around a stationary pivot pin 54, or post, in one of the termination units 20, 22 to allow the rope to pivot at the post, which forms a pivot 52. The pivots 52 are spaced apart at circumferentially opposite positions with the pivot axes 56 of the two ropes at each termination unit coincident. Each rope and its terminating pivots form a linkage that avoids bending of the ropes as the flexible section bends. To increase the static bend diameter and reduce bearing loads and frictional wear of the rope, an eyelet 48 may be interposed between the loop and the pivot pin 54. In that arrangement, the closed loop 46 is snugly received in the eyelet 48, which is pivotably attached to one of the termination units 20, 22. A peripheral groove 50 in the eyelet forms a bearing surface against which the rope loop bears, as shown in FIG. 4, as well. The eyelets 48 are attached to the pivots 52 formed by the pivot pins 54 through holes 55 in the eyelets.

Figure 5A:
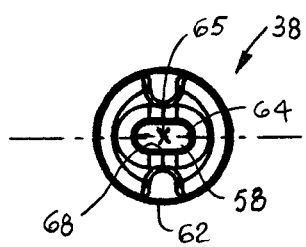
FIGS. 5A and 5B are axial end and cross sectional views of a spacer ring useable in the flexible section of FIGS. 2A and 2B.
Figure 5B:
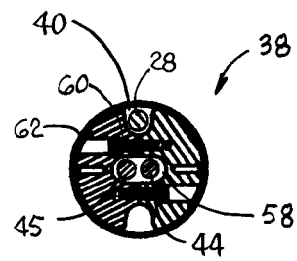

The two ropes 44, 45 are received side by side in a central bore 58 in the spacer ring 38, as shown in FIGS. 5A and 5B. The ring is made of two identical ring halves fastened with screws 60 and confined within an outer sleeve 62. The conductor bundle 28 passes through the slot 40 in the periphery of the ring just inside the outer sleeve 62.

As shown in FIGS. 5A and 5B, the bore 58 has a noncircular cross section at its openings onto the axial ends of the ring 38. The bore's cross section has an elongated major axis 64 perpendicular to the bore's main axis 65, which is directed into and out of the page in FIG. 5A as indicated by the "X." The noncircular shape of the bore and its dimensions relative to the diameters of the ropes prevent the ropes from crossing each other in the bore. But the bores could have circular or other-shaped cross sections. Or the ring could have two bores—one for each rope.

Figure 6A:
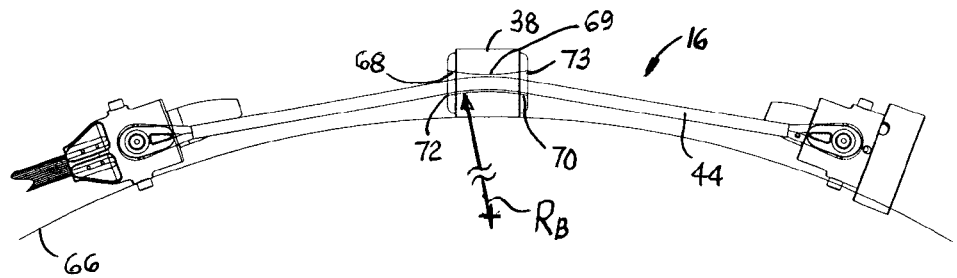
FIGS. 6A and 6B are side elevation views of a flexible section as in FIGS. 2A and 2B rounding a cable-handling drum in preferred and non-preferred orientations.
Figure 6B:
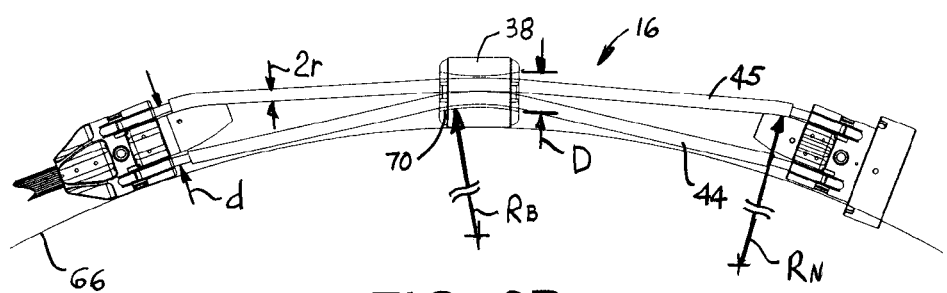

FIGS. 6A and 6B show the flexible section 16 following a nonlinear retrieval path around a roller or a sheave 66 on the periphery of a drum in a survey vessel's cable-handling equipment. The preferred orientation of the flexible section is shown in FIG. 6A, in which the two ropes 44, 45 are substantially equi-distant from the sheave 66. When the flexible section is oriented relative to the bend as shown in FIG. 6B, the tension in the outer rope 45 is greater than the tension in the inner rope 44. As soon as the ropes shift slightly off a radial line of the sheave's drum, as they are bound to do, the momentary greater tension in the outer rope produces a net force directed toward the sheave and offset from the axis of the seismic cable. The inwardly directed force causes a torque that rotates the cable about its axis until the torque vanishes when the ropes are oriented in equilibrium, sharing tension, as in FIG. 6A. Thus, the system is self-aligning. The ring 38 can be made of a rigid material to survive the load applied by the drum or other cable-handling equipment and to protect the ropes and the conductor bundle from being crushed.

As shown in FIGS. 6A and 6B, as well as in FIGS. 5A and 5B, the bore 58 is bounded by a bore wall 68. The bore flares outward in both directions from a central point 69 at its waist. The noncircular bore wall has a curvature 70 from a first end 72 to a second end 73 of the ring 38. The curvature is the same along any curved geodesic line connecting two corresponding points at the opening of the bore onto the first and second ends. In this way, the curvature of the bore provides a predetermined bend radius $R_B$ to the ropes when they bear against the bore wall. The bend ratio of a rope is the ratio of the bend radius of the rope to the rope's radius. The expected fatigue life of a rope depends on, among other factors, the bend ratio that the rope is subjected to during bending. The recommended and minimum bend ratios of a given rope depend on the rope material and are specified by the manufacturer. For a rope bent around a surface of a structure once and then fixed in place, a static bend ratio is specified. When the rope is to be repeatedly bent over a surface, a dynamic bend ratio is specified. The ratio of the bend radius of the ring's bore $R_B$ to the radius r of the ropes 44, 45 should be greater than or equal to the manufacturer-specified dynamic bend ratio as required by the rope material to ensure that the rope doesn't bend sharply enough to suffer bending fatigue. As shown in FIG. 6B, the maximum opening dimension D of the outwardly flared bore at the first and second ends 72, 73 of the rings 38 is less than the distances d between the ropes 44, 45 at the termination units 20, 22. Thus, the two ropes converge with distance from the termination units toward the ring.

To further avoid sharp bends in the rope, the outer faces 34 of the conductor bundle's termination nuts 30 are shaped like nosecones. The outer faces have a radius of curvature $R_N$, as shown in FIG. 6B. The ratio of the radius of curvature $R_N$ to the radius r of the rope is selected to be greater than or equal to the manufacturer-specified dynamic bend ratio of the rope to ensure that the rope doesn't bend sharply enough around the termination nuts 30 to suffer bending fatigue.

Figure 7:
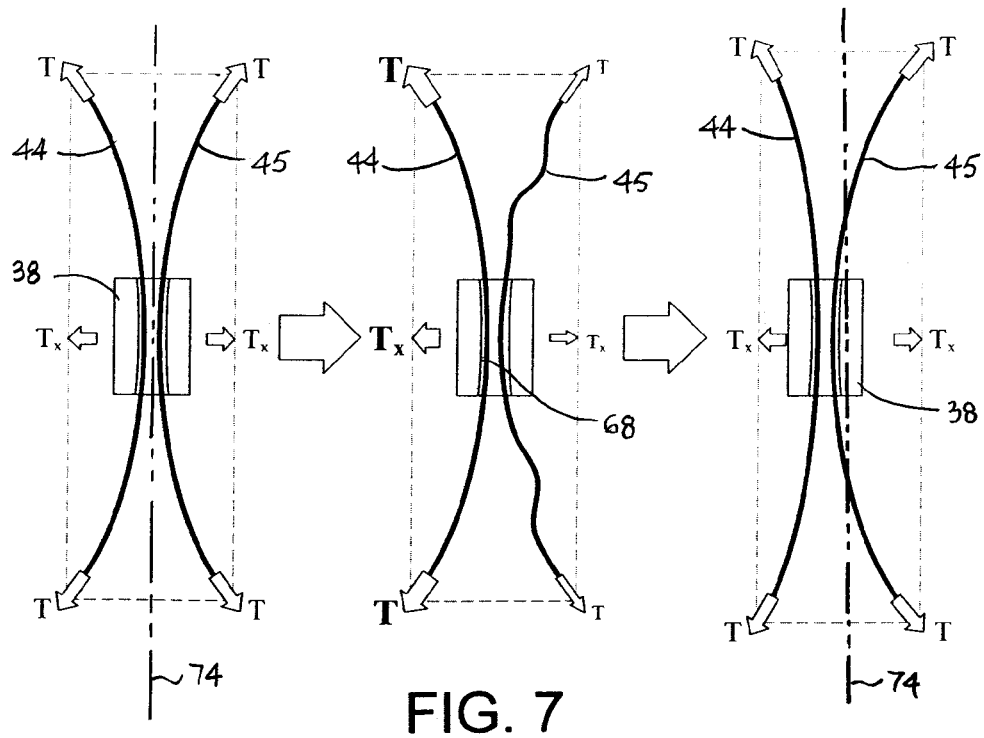
FIG. 7 is a diagram of the spacer ring of FIGS. 5A and 5B illustrating the tension-sharing effect of the ring on the ropes.

FIG. 7 shows how the ring 38 may also balance the cable tension in the two ropes 44, 45. If both ropes are the same length as in the leftmost illustration, the ring 38 positions itself along the centerline 74 of the flexible section 16. If one of the ropes 45 is longer than the other rope 44 as in the middle illustration, the longer rope 45 is slackened and the majority of the cable tension T is borne by the shorter rope 44. The tighter, shorter rope 44 bears against the bore wall 68 with a greater radial force $T_x$, directed to the left in FIG. 7, which causes the ring 38 to translate to the left off the centerline a sufficient distance to remove the slack from the longer rope 45 so that the cable tension is equally shared between the two ropes as in the rightmost illustration in FIG. 7. In this way, the ring 38 compensates for manufacturing tolerances in the lengths of the stress-member ropes 44, 45.

The drawings and description describe a two-rope tension-balancing system by way of example. But more than two ropes could be used: for example, three ropes terminated on the termination units at uniform circumferential locations every 120° or four ropes terminated circumferentially every 90°.

Thus, the flexible section provides an acoustic-isolation and rope-tension-balancing system that mechanically and electrically terminates a series of segments of different stiffnesses in a marine seismic cable and that allows repetitive high-tension retrieval of seismic cables over curved surfaces, such as rollers in cable-handling equipment.

What is claimed is:

1. A flexible section of an underwater seismic cable, comprising:
    first and second termination units;
    two or more ropes, each pivotably attached at one end to the first termination unit and at the other end to the second termination unit;
    a ring having a bore bounded by a bore wall surrounding a portion of the two or more ropes between the first and second termination units;
    wherein the ring has a single bore through which the two or more ropes pass; and wherein the ring includes a bore wall bounding the bore and having a curvature of the ring providing a bend radius $R_B$ for the two or more ropes in the bore.

2. A flexible section as in claim 1 wherein the cross section of the bore perpendicular to the bore's axis is circular.

3. A flexible section as in claim 1 wherein the cross section of the bore perpendicular to the bore's axis is elongated along a major axis perpendicular to the bore's axis.

4. A flexible section as claim 1 wherein the two or more ropes each have a radius r and the bend ratio $R_B/r$ is greater than or equal to the manufacturer-specified dynamic bend ratio of the two or more ropes.

5. A flexible section as in claim 1 wherein the two or more ropes converge with distance from the first and second termination units toward the ring.

6. A flexible section as in claim 1 wherein the ropes have loops at each end and the first and second termination units include stationary pivot pins around which the loops pivot.

7. A flexible section as in claim 6 wherein the first and second termination units have eyelets pivotably retained on the pivot pins and wherein the rope loops are received by the eyelets.

8. A seismic cable comprising a plurality of flexible sections as in claim 1, and further comprising:
a plurality of sensor housings, each housing one or more sensors;
a plurality of seismic cable segments including stress members and electrical conductors;
wherein each of the flexible sections is connected to one of the cable segments at one end and to one of the sensor housings at an opposite end to form a repeating serial connection of a first cable segment to a first flexible section to a first sensor housing to a second flexible section to a second cable segment to a third flexible section and so on along the length of the seismic cable.

9. A flexible section of an underwater seismic cable, comprising:
first and second termination units;
a first set of eyelets pivotably attached to the first termination unit, each having a peripheral bearing surface;
a second set of eyelets pivotably attached to the second termination unit, each having a peripheral bearing surface;
a plurality of ropes, each extending from the first termination unit to the second termination unit and having closed loops at opposite first and second ends, wherein the closed loop at the first end of each of the ropes is received on the bearing surface of a respective one of the first set of eyelets and the closed loop at the second end of each of the ropes is received on the bearing surface of a respective one of the second set of eyelets.

10. A flexible section as in claim 9 further comprising a ring disposed between the first and second termination units, wherein the ring has an axis and an interior bore wall defining a bore extending along the axis and opening onto opposite first and second ends of the ring to receive the ropes, and wherein the bore flares outward toward the first and second ends from a central axial position.

11. A flexible section as in claim 10 wherein the cross section of the bore perpendicular to the axis is circular.

12. A flexible section as in claim 10 wherein the cross section of the bore perpendicular to the bore's axis is elongated along a major axis perpendicular to the bore's axis.

13. A flexible section as in claim 10 wherein the bore wall has a curvature between the first and second ends of the ring providing a bend radius $R_B$ for the ropes in the bore.

14. A flexible section as claim 13 wherein the ropes each have a radius r and the bend ratio $R_B/r$ is greater than or equal to the manufacturer-specified dynamic bend ratio of the ropes.

15. A flexible section as in claim 9 wherein the first and second termination units have pivot pins on which the first and second sets of eyelets pivot disposed at uniformly spaced circumferential positions on the first and second termination units.

16. A flexible section as in claim 9 wherein the peripheral bearing surfaces form grooves in the peripheries of the eyelets.

17. A flexible section as in claim 9 further comprising a conductor bundle and first and second termination nuts at opposite ends of the conductor bundle, each of the termination nuts having a base and a nosecone-shaped face, wherein the base of the first termination nut is fastened to the first termination unit and the base of the second termination nut is fastened to the second termination unit and the nosecone-shaped faces of the first and second termination nuts extend in length outward from the first and second termination units toward each other.

18. A flexible section as in claim 17 wherein the nosecone-shaped faces of the first and second termination nuts have a radius of curvature $R_N$ along their lengths and wherein the ropes each have a radius r and the bend ratio $R_N/r$ is greater than or equal to the manufacturer-specified dynamic bend ratio of the ropes.

19. A flexible section as in claim 9 wherein the first termination unit is attached to an armored cable and the second termination unit includes a connection to a sensor housing.

20. A flexible section of an underwater seismic cable, comprising:
first and second termination units;
a plurality of ropes, each having a first end attached to the first termination unit and a second end attached to the second termination unit, wherein the first ends are spaced apart a first distance on the first termination unit and the second ends are spaced apart a second distance on the second termination unit;
a ring disposed between the first and second termination units and having opposite first and second ends and a central bore that opens onto the first and second ends through which the ropes extend side by side, wherein the bore through the ring has a first maximum opening dimension at the first end that is less than the first distance and a second maximum opening dimension at the second end that is less than the second distance.

21. A flexible section as in claim 20 wherein the bore flares outward toward the first and second ends of the ring from a central position.

22. A flexible section as in claim 21 comprising a bore wall defining the bore and having a curvature between the first and second ends of the ring providing a bend radius $R_B$ for the ropes in the bore, wherein the ropes each have a radius r and the bend ratio $R_B/r$ is greater than or equal to the manufacturer-specified dynamic bend ratio of the ropes.

23. A flexible section as in claim 20 wherein the cross section of the bore opening onto the first and second ends of the ring is circular.

24. A flexible section as in claim 20 wherein the cross section of the bore opening onto the first and second ends of the ring is elongated along a major axis.

25. A flexible section as in claim 20 wherein the ropes have loops at each end and the first and second termination units include stationary posts around which the loops pivot.

26. A flexible section as in claim 25 wherein the first and second termination units have eyelets pivotably retained on the stationary posts and wherein the eyelets are received in the loops.

* * * * *